United States Patent [19]

Negoro

[11] Patent Number: 5,561,248
[45] Date of Patent: Oct. 1, 1996

[54] ACCELERATION SENSOR

[75] Inventor: Yasuhiro Negoro, Nagaokakyo, Japan

[73] Assignee: Murata Manufacturing Co., Ltd., Nagaokakyo, Japan

[21] Appl. No.: 211,710

[22] PCT Filed: Sep. 2, 1993

[86] PCT No.: PCT/JP93/01241

§ 371 Date: Apr. 21, 1994

§ 102(e) Date: Apr. 21, 1994

[87] PCT Pub. No.: WO94/06024

PCT Pub. Date: Mar. 17, 1994

[30] Foreign Application Priority Data

Sep. 4, 1992 [JP] Japan ..................................... 4-263013

[51] Int. Cl.[6] .................................................. G01P 15/125
[52] U.S. Cl. ................................... 73/514.32; 73/514.36; 361/283.3
[58] Field of Search .......................... 73/517 R, 517 B, 73/517 V, 514.18, 514.23, 514.32, 514.21, 514.36; 361/280, 283.1, 283.3

[56] References Cited

U.S. PATENT DOCUMENTS

| 4,653,326 | 3/1987 | Danel et al. | 73/514.32 |
| 4,987,779 | 1/1991 | McBrien | 73/517 B |
| 5,006,487 | 4/1991 | Stokes | 73/517 R |
| 5,081,867 | 1/1992 | Yamada | 73/517 R |
| 5,095,752 | 3/1992 | Suzuki et al. | 73/517 R |
| 5,151,763 | 9/1992 | Marek et al. | 361/280 |
| 5,189,500 | 2/1993 | Kusunoki | 359/72 |
| 5,228,341 | 7/1993 | Tsuchitani et al. | 73/517 R |
| 5,243,861 | 9/1993 | Kloeck et al. | 73/517 R |
| 5,285,097 | 2/1994 | Hirai | 361/283.1 |
| 5,324,980 | 6/1994 | Kusunoki | 257/74 |
| 5,343,064 | 8/1994 | Spangler et al. | 257/350 |
| 5,367,429 | 11/1994 | Tsuchitani et al. | 361/280 |
| 5,381,300 | 1/1995 | Thomas et al. | 361/280 |

Primary Examiner—Hezron E. Williams
Assistant Examiner—Richard A. Moller
Attorney, Agent, or Firm—Oblon, Spivak, McClelland, Maier & Neustadt, P.C.

[57] ABSTRACT

An acceleration sensor having movable and stationary electrodes electrically insulated from each other in a reliable manner to improve the accuracy and sensitivity in the detection of acceleration. The acceleration sensor includes an upper substrate (1) of a low resistivity silicon material, a lower substrate (2) of an insulating material provided under the upper substrate (1), and an insulating groove (5) perforating the upper substrate (1) completely from the upper to lower side thereof and around the entire periphery of a support beam (4) in the upper substrate (1). By using the upper substrate (1), stationary blocks (6) are formed separately on the opposite sides of the support beam (4) in confronting relation therewith. As a result, the support beam (4) and the stationary blocks (6), each being formed of the same low resistance material, are electrically insulated from each other by the insulating groove (5). An acceleration signal is produced on the basis of a variation in electrostatic capacitance across movable and stationary electrodes, which are constituted by a mass portion (4C) of the support beam (4) and each of the stationary blocks (6).

20 Claims, 8 Drawing Sheets

ACCELERATION SENSOR

FIELD OF THE ART

This invention relates to an acceleration sensor which can be suitably used for detecting the degree of acceleration of a moving body, for example, of a motor vehicle or the like, and more particularly to an acceleration sensor of the type which employs a cantilever type support beam to be displaced in a horizontal direction according to the degree of acceleration.

DESCRIPTION OF THE PRIOR ART

As disclosed in Japanese Laid-Open Patent Specification 62-232171, for example, conventional cantilever type acceleration sensors generally include, in or on a silicon substrate, a support beam which is fixed at its base end and has a mass portion in its fore free end portion to be displaced together with the silicon substrate in a horizontal direction according to the degree of acceleration, a substantially U-shaped groove opened through the upper and lower sides of the silicon substrate in such a manner as to circumvent the peripheral edges of the support beam except the fixed base end thereof, a stationary section defined by the just-mentioned groove as an integral part of the silicon substrate around and with a predetermined spacing from the peripheral edges of the support beam, a movable electrode formed on the support beam by means of a p-type diffusion layer of low resistance provided on the surface of the silicon substrate, and a stationary electrode formed similarly on the stationary section in face to face relation with the support beam.

Further, Japanese Laid-Open Patent Specification 60-159658 discloses another conventional acceleration sensor which employs a support beam having its fixed base end integrally connected with the substrate and having a mass portion on its fore end portion for displacement in a horizontal direction according to the degree of acceleration, a stationary section formed on one side of the support beam by a recess substantially of U-shape, a movable electrode formed on a lateral side surface of the support beam by a vapor deposition process or the like, and a stationary electrode formed on a lateral side surface of the stationary section in face to face relation with the side surface of the support beam.

The support beam in each of the above-described conventional acceleration sensors is designed to have a smaller dimension in width than in thickness for the purpose of imparting directionability in a particular direction pertaining to the detection of acceleration. While the support beam is displaced horizontally together with the silicon substrate, a variation in electrostatic capacity which takes place between the two electrodes is detected as a signal indicative of the degree of acceleration.

In the above-described conventional acceleration sensors, the support beam and the stationary section are formed in a silicon substrate with normally high resistivity of several Ωcm or higher. Therefore, for the purpose of detecting variations in electrostatic capacity resulting from horizontal displacements of the support beam, it has been necessitated to form a layer of low resistance on the surfaces of the stationary section (i.e., on the surfaces on the opposite side walls of the recess) by diffusing phosphorus or the like, or by depositing a metal on the surfaces of the support beam and the stationary section, for example, by a vapor deposition process separately in different stages of the fabrication process to provide the movable and stationary electrodes thereon.

Therefore, in order to enhance the sensitivity of detection of the acceleration force, the above-described conventional arrangements require to narrow the width of the groove between the electrodes to a dimension of the order of several tens µm and to provide low resistivity portions separately on the opposite side walls of the narrow groove for the formation of the movable and stationary electrodes, resulting in complication of the fabrication process and increases in production cost.

Especially, in the case of the conventional construction as shown in Japanese Laid-Open Patent Specification 62-232171, the fabrication process includes a step of forming a couple of grooves by etching in spaced positions on a silicon substrate through the upper and lower sides thereof, followed by a step of forming a p-type diffusion layer of low resistivity on the silicon substrate surfaces which surround the respective grooves, and then by another etching step for broadening and connecting the respective grooves into a groove of substantially U-shape to separate the p-type diffusion layer to the opposite sides of the groove for the formation of movable and stationary electrodes. Accordingly, the formation of the groove is completed by way of two etching steps before and after the step of forming the p-type diffusion layer, complicating the fabrication process to a considerable degree and entailing a substantial increase in production cost.

Further, in the case of the conventional construction according to the above-mentioned Japanese Laid-Open Patent Specification 60-159658 in which the metal electrodes are formed on the side surfaces of the support beam and the recess by separate vapor deposition processes, it has been found difficult to form the electrodes of uniform quality in addition to the problem of complication of the fabrication process.

Besides, in each of the above-described conventional construction, simply a completely perforated groove of U-shape is formed around the peripheral edges of a support beam except its fixed base end which is integrally connected to a stationary section in the remainder of the silicon substrate itself. Accordingly, these conventional constructions suffer from another problem that, due to inferior electrical insulation between the movable and stationary electrodes, they are susceptible to influences of noises which would considerably impair the accuracy and sensitivity in the detection of acceleration.

In view of the above-discussed problems or drawbacks of the prior art, the present invention has as its object the provision of an acceleration sensor which is arranged to insulate movable and stationary electrodes from each other in a secure manner while suppressing the influence of noises to attain improvements in accuracy and sensitivity of detection in the measurement of acceleration.

DISCLOSURE OF THE INVENTION

According to the present invention, the above-stated objective is achieved by the provision of an acceleration sensor construction which comprises: a first substrate formed of a silicon material of low resistance; and a second substrate provided on the lower side of the first substrate and electrically insulated from the first substrate; the first substrate including a support beam having a mass portion for displacement in a horizontal direction according to the degree of acceleration, an insulating groove completely perforating the first substrate around the entire periphery of the support beam, and stationary blocks defined by the insulating groove in spaced positions on the outer sides of the support beam and fixed to the second substrate.

In this instance, the above-described insulating groove defines a narrow detection groove between the mass portion of the support beam and the stationary blocks, and movable and stationary electrodes are formed on lateral side surfaces of the support beam and the stationary blocks in face to face relation with each other across the detection groove.

With this sensor construction according to the present invention, one etching treatment on the first substrate of low resistance silicon material can complete the formation of an insulating groove which completely perforates the first substrate, along with the formation of a support beam and stationary blocks which are separated and electrically insulated from the support beam through the insulating groove. Thus, there are simultaneously formed the support beam and the stationary blocks which serve as movable and stationary electrodes, respectively.

In an acceleration sensor of the above construction, an accelerative force acting in the horizontal direction causes the mass portion of the support beam to displace in the horizontal direction according to the degree of acceleration, varying the electrostatic capacitance across the detection groove between the mass portion and each stationary block. This variation in electrostatic capacitance is directly detected for use as a detection signal indicative of the degree of acceleration.

Further, according to the present invention, the support beam is securely fixed to the second substrate at its base end to form a fixed end thereat, and reduced in thickness in its intermediate portion to provide a cantilever type support for the mass portion in its fore free end portion to be displaced horizontally according to the degree of acceleration in the fashion of a cantilever type acceleration sensor.

In this case, in order to prevent the mass portion on the support beam from contacting the stationary blocks, the second substrate is provided with stopper portions in positions on the opposite sides of the fore end of the mass portion, thereby delimiting the amount of displacement of the support beam and keeping same out of contact with the respective stationary blocks.

Further, according to the invention, the first substrate is preferably formed of a low resistance silicon material with a (110) crystal face.

The second substrate is preferably formed of a vitreous material and bonded to the lower side of the first substrate through a glass layer.

BEST MODE FOR CARRYING OUT THE INVENTION

Hereafter, the invention is described by way of its preferred embodiments with reference to FIGS. 1 through 11, each exemplifying a case of forming a single cantilever type acceleration sensor on a substrate.

Referring first to FIGS. 1 through 9, there is illustrated a first embodiment of the acceleration sensor according to the invention, wherein indicated at 1 is a first substrate or an upper substrate which is formed of an n-type silicon material of low resistivity, for example, of about 10 mΩcm (0.01 Ωcm). The upper substrate 1 has a (110) crystal face. Upon forming an insulating groove 5 internally of the upper substrate 1 in the manner as will be described later, a support beam 4 and stationary blocks 6 are integrally formed on the substrate.

Indicated at 2 is a second substrate or a lower substrate which is joined to the lower side of the upper substrate 1 through a glass layer 3. This lower substrate 2 is formed of an insulating material, for example, from a glass or vitreous material or the like. In cooperation with the insulating groove 5, the lower substrate 2 maintains electrical insulation between the support beam 4 and the stationary blocks 6. The glass layer 3 exists between the entire peripheral edge portions of the upper and lower substrates 1 and 2 but does not exist in center portions thereof in order to ensure displacements of the support beam 4.

Figure 1:
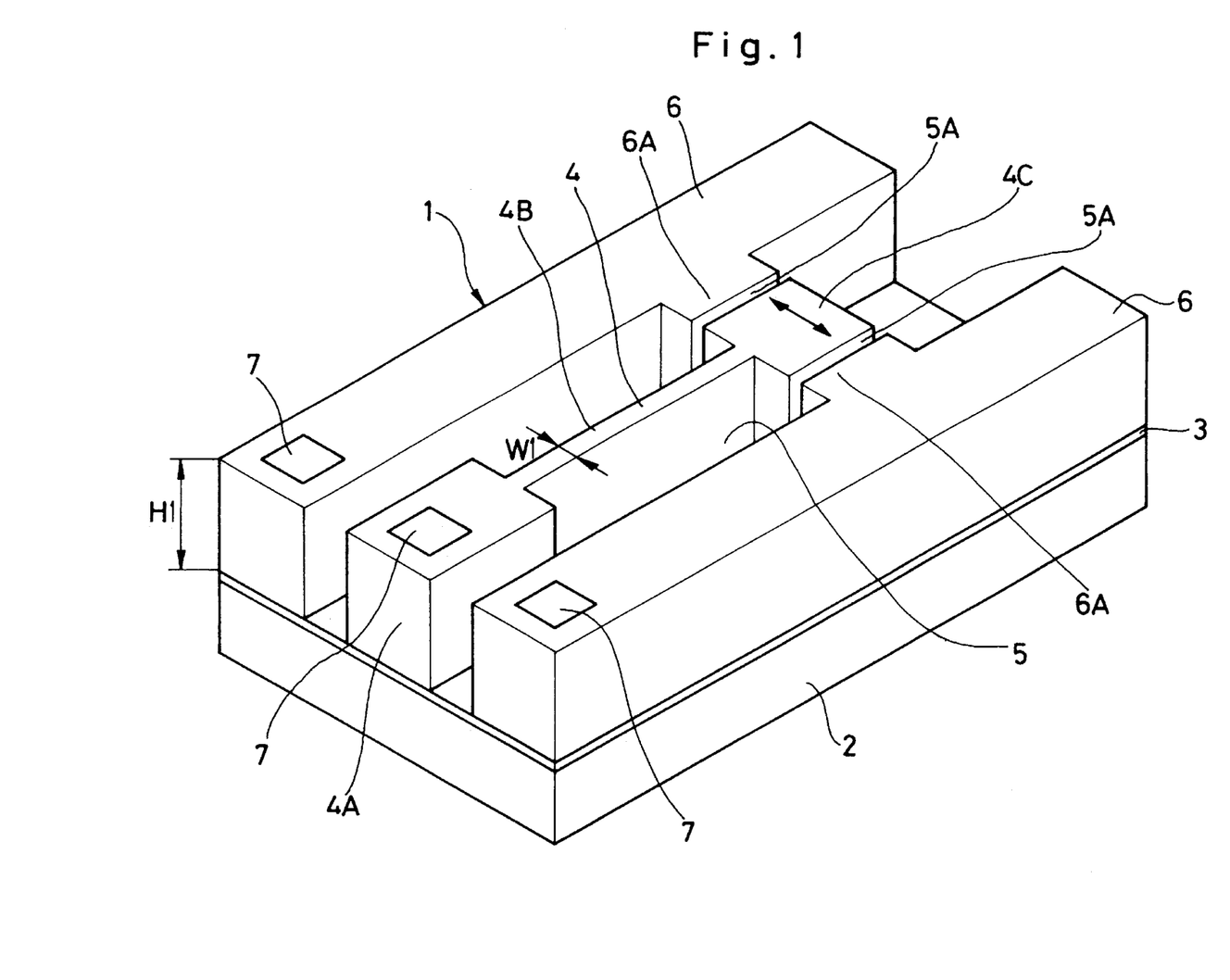
FIG. 1 is a perspective view of an acceleration sensor in a first embodiment of the present invention.
Figure 2:
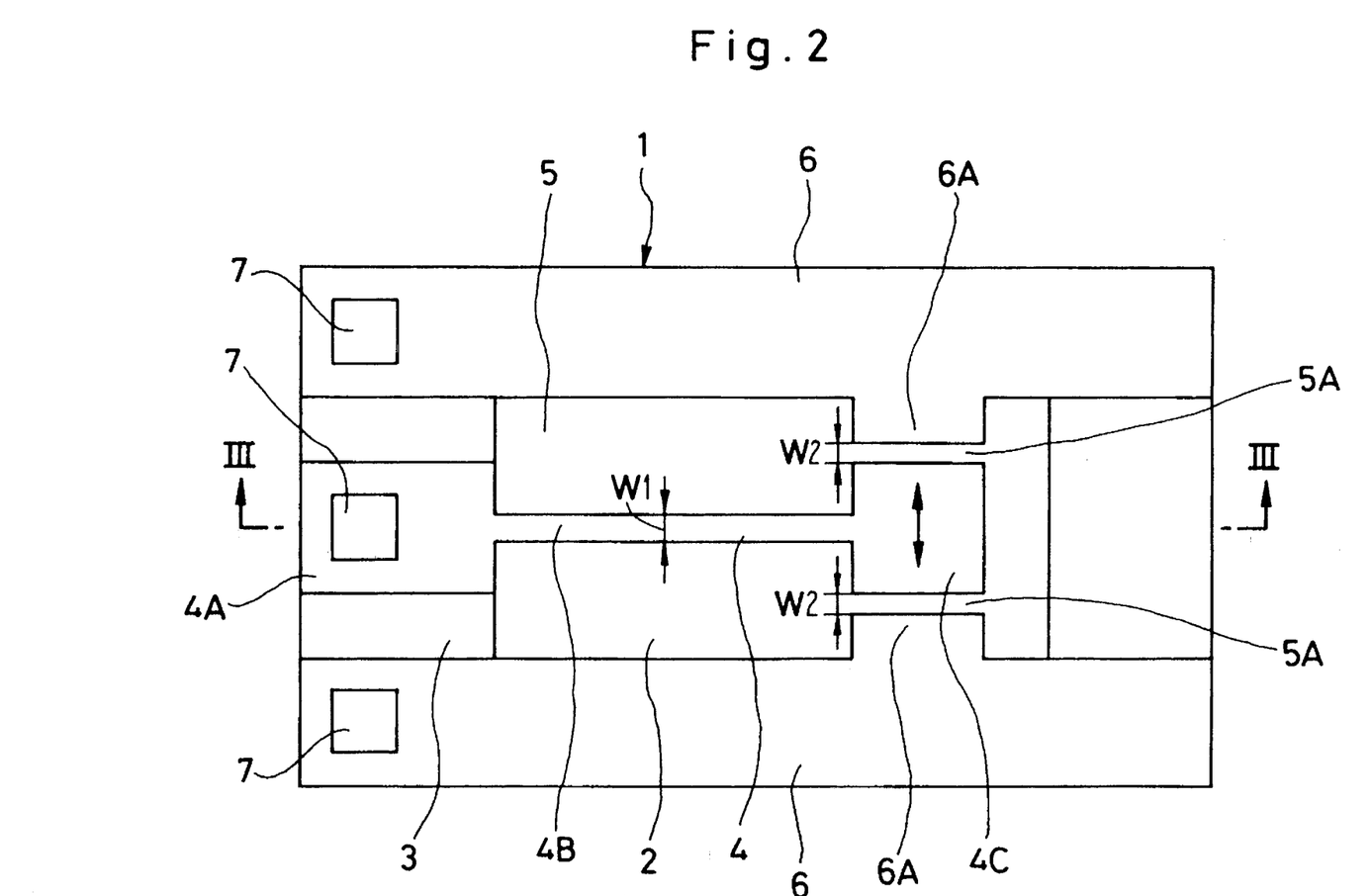
FIG. 2 is a plan view of the acceleration sensor of FIG. 1.

The support beam 4 is formed internally of and out of the upper substrate 1 and, as shown in FIG. 2. The support beam 4 is fixed to the lower substrate 2 at its base end to provide a fixed end 4A, and reduced in thickness in its intermediate portion to provide a thin support portion 4B with a width smaller than the thickness of the upper substrate 1 itself, and its fore free end portion which is increased in thickness to provide a mass portion 4C with predetermined mass. The support beam 4, having the thin support portion 4B with a width W1 which is smaller than the thickness H1 of the upper substrate 1, is imparted with directionability in the horizontal direction, and therefore it is displaceable in the horizontal direction according to the degree of acceleration. As shown particularly in FIG. 3, the lower surfaces of the support portion 4B and mass portion 4C of the support beam 4 are spaced from the upper surface of the lower substrate 2 by a gap space S corresponding to the thickness of the glass layer 3. In this instance, the support beam 4 is formed out of the upper substrate 1 of low resistance, so that its entire body is conductive and the lateral side surfaces of the mass portion 4C can serve as movable electrodes which are displaceable according to the magnitude of vibration.

Figure 3:
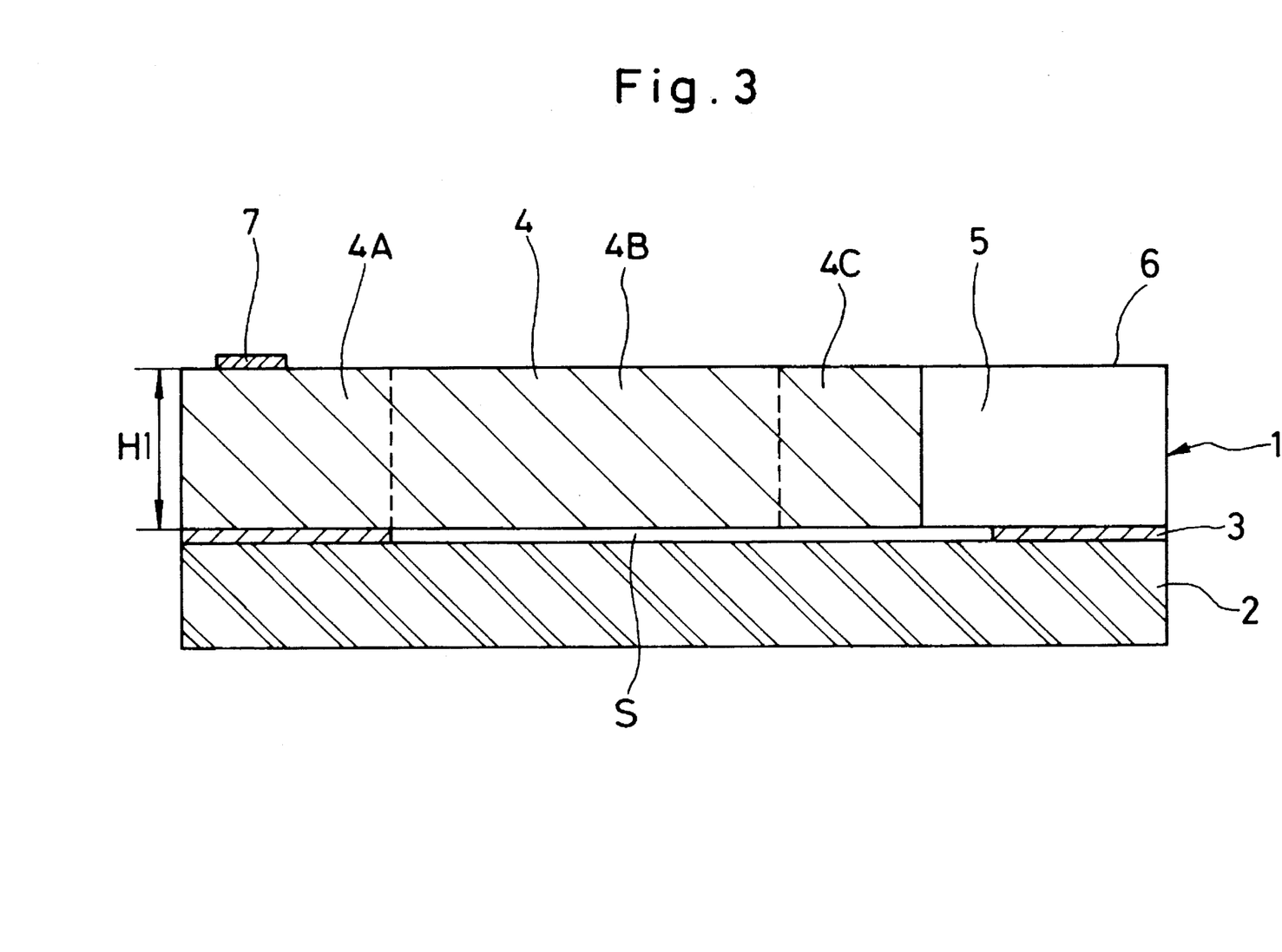
FIG. 3 is a vertical sectional view taken on line III—III of FIG. 2.

Indicated at 5 is the insulating groove which is bored into the upper substrate 1 in such a manner as to circumvent the entire periphery of the support beam 4. As seen in FIGS. 2 and 3, the upper substrate 1 is completely perforated by the insulating groove 5 from its upper to lower side around the entire periphery of the support beam 4. As a consequence, the support beam 4 of low resistance silicon material is separated and electrically insulated from the respective stationary blocks 6 by the intervening insulating groove 5. The insulating groove 5 is arranged to form a narrow detection groove 5A with a predetermined width W2, for example, a width smaller than several tens µm between the mass portion 4C and the opposing stationary block 6 on each side of the support beam 4.

The reference 6 denotes the stationary blocks which are provided on the opposite sides of the support beam 4 in face to face relation with the latter across the detection groove 5A. Each stationary block 6 is formed in the upper substrate 1 by the insulating groove 5. Since each stationary block 6 is formed out of the upper substrate 1 of a low resistance material similarly to the support beam 4, it is conductive in its entire body including a projected portion 6A providing a stationary electrode on its side surface confronting the mass portion 4C of the support beam 4 across the detection groove 5A.

Indicated at 7 are wiring electrodes which are provided on the top surfaces of the fixed end 4A of the support beam 4 and the respective stationary blocks 6, each of the wiring electrodes 7 being formed of a conductive alloy material of gold, titanium or the like. The lower sides of the wiring electrodes 7 are electrically connected to the movable electrodes on the opposite lateral side surfaces of the mass portion 4C and the stationary electrodes on the lateral side surfaces of the projected portions 6A through the support beam 4 and the stationary blocks 6 of low resistance, respectively, while the upper sides of the wiring electrodes are connected to an electrostatic capacitance detection circuit through lead wires (not shown).

The acceleration sensor of this embodiment, with the above-described construction, can be fabricated in the manner as shown in FIGS. 4 through 9.

Figure 4:
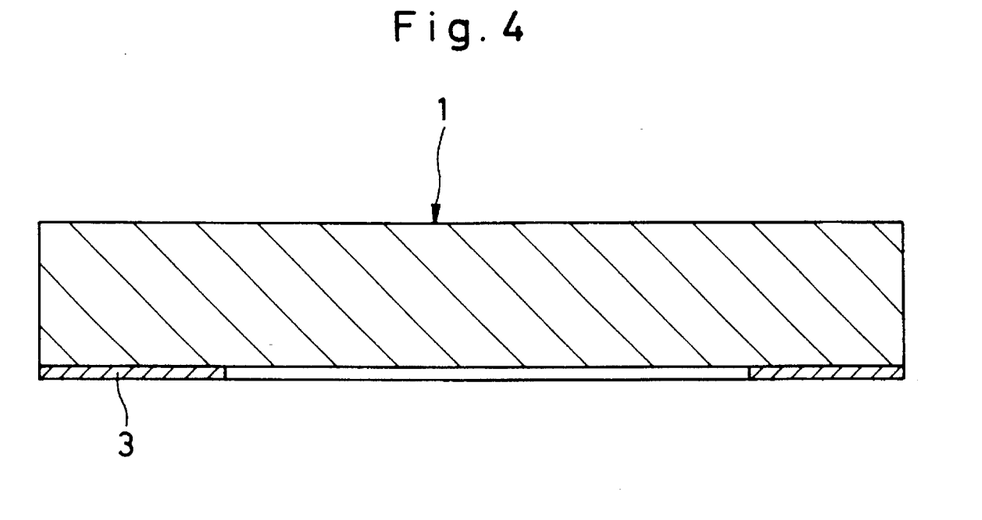
FIG. 4 is a vertical sectional view similar to FIG. 3, showing a step of forming a glass layer.

Shown in FIG. 4 is a step of the fabrication process, i.e. a step of forming a glass layer, in which, for bonding the lower substrate 2 to the upper substrate 1 of low resistance silicon material, a glass layer 3 of low melting point is formed on the entire peripheral edge portions on the lower side of the upper substrate 1.

Figure 5:
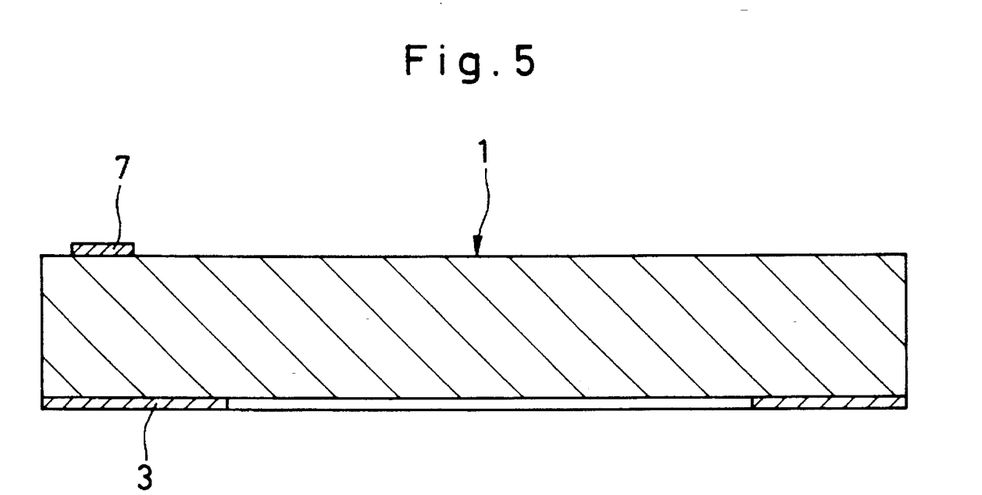
FIG. 5 is a vertical sectional view, showing a step of forming wiring electrodes after the step of forming a glass layer shown in FIG. 4.

FIG. 5 shows a next step of forming the wiring electrodes, in which the respective wiring electrodes 7 are formed on predetermined positions on the top surface of the upper substrate 1 by vapor deposition of a conductive material such as gold alloy or the like.

Figure 6:
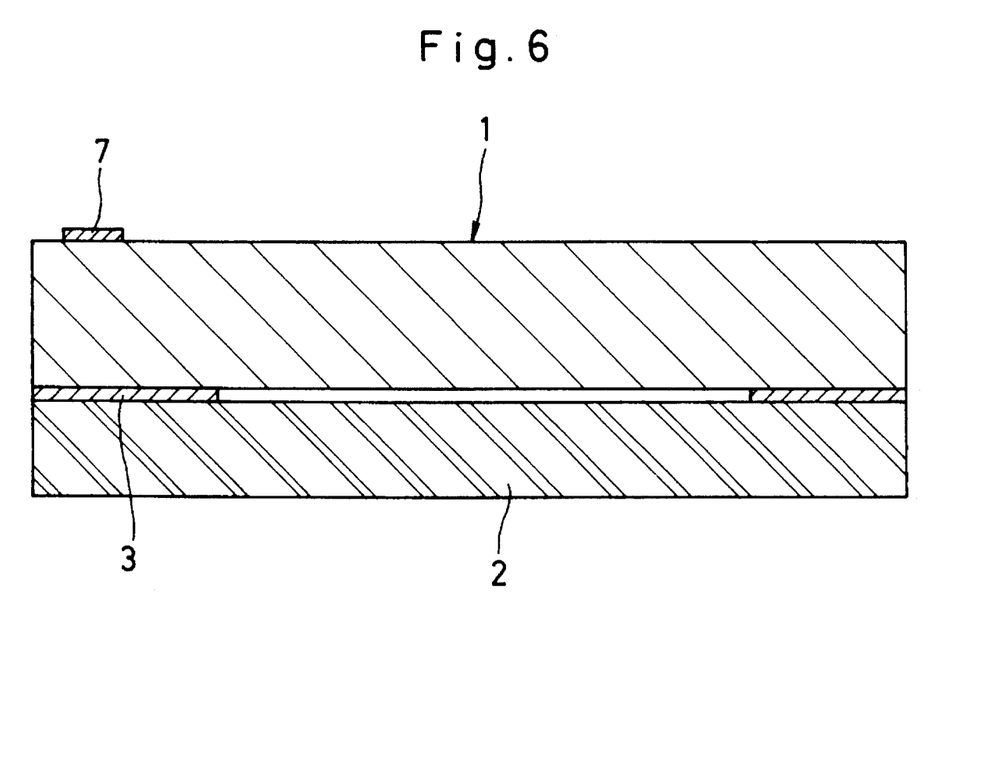
FIG. 6 is a vertical sectional view, showing a step of bonding a lower substrate, subsequent to the step of forming wiring electrodes shown in FIG. 5.

FIG. 6 shows a step of bonding the lower substrate, in which the lower substrate 2 of vitreous insulating material or the like is bonded through the glass layer 3 to the lower side of the upper substrate 1, which has been formed with the wiring electrodes 7, by means of the anodic bonding technology for insulating the upper substrate 1 from beneath.

Figure 7:
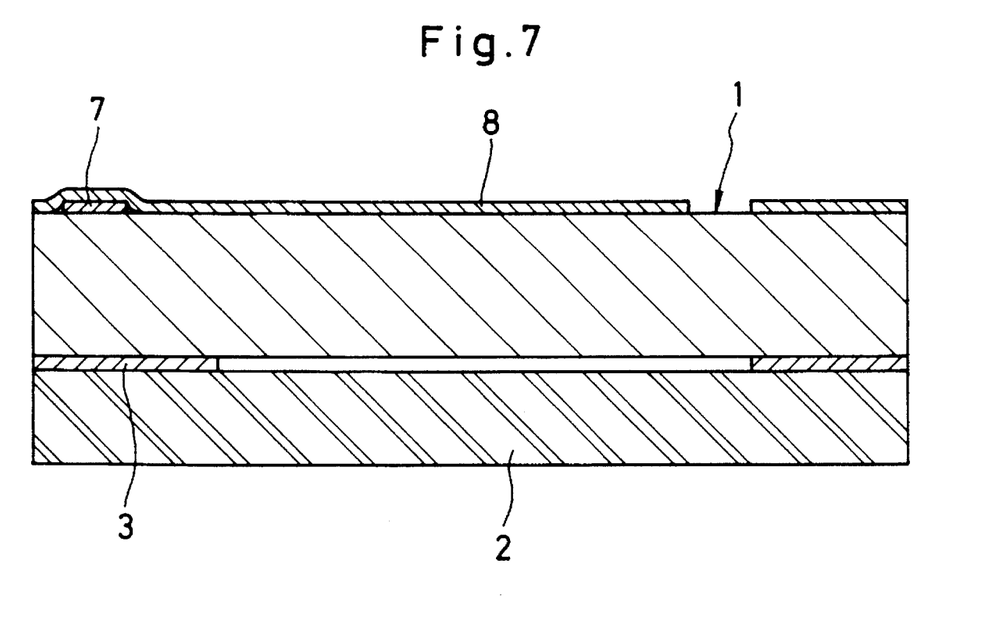
FIG. 7 is a vertical sectional view, showing a step of forming a masking film, subsequent to the step of bonding the lower substrate shown in FIG. 6.

FIG. 7 shows a next step of coating a masking film, in which a masking film 8 of silicon nitride (SiN) is formed on the top surface of the upper substrate 1 by CVD, followed by removal of part of the masking film 8 by etching or photolithography to define the support beam 4 and the respective stationary blocks 6 (or to define the insulating groove 5) in a predetermined pattern.

Figure 8:
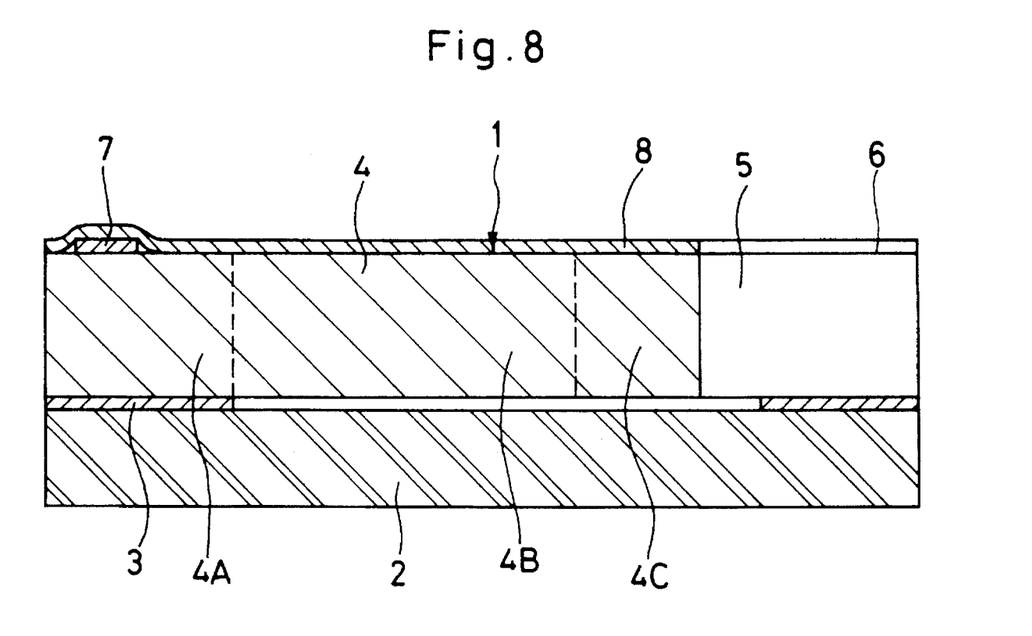
FIG. 8 is a vertical sectional view, showing a step of forming an insulating groove, subsequent to the step of forming the masking film shown in FIG. 7.

Illustrated in FIG. 8 is a next step of forming the insulating groove, in which an alkaline etching solution, for example, TMAH (tetramethyl ammonium hydroxide), KOH or the like is applied to the upper substrate coated with the masking film 8, which has been formed as a mask in the preceding film coating step, for crystal face selective etching thereby forming the insulating groove 5 which perforates the upper substrate 1 completely from the upper to lower side thereof along the entire periphery of the support beam 4. Concurrently with the formation of the insulating groove 5, the support beam 4 and the respective stationary blocks 6, which are separated from each other by the insulating groove 5, are formed on the upper substrate 1 simultaneously.

Figure 9:
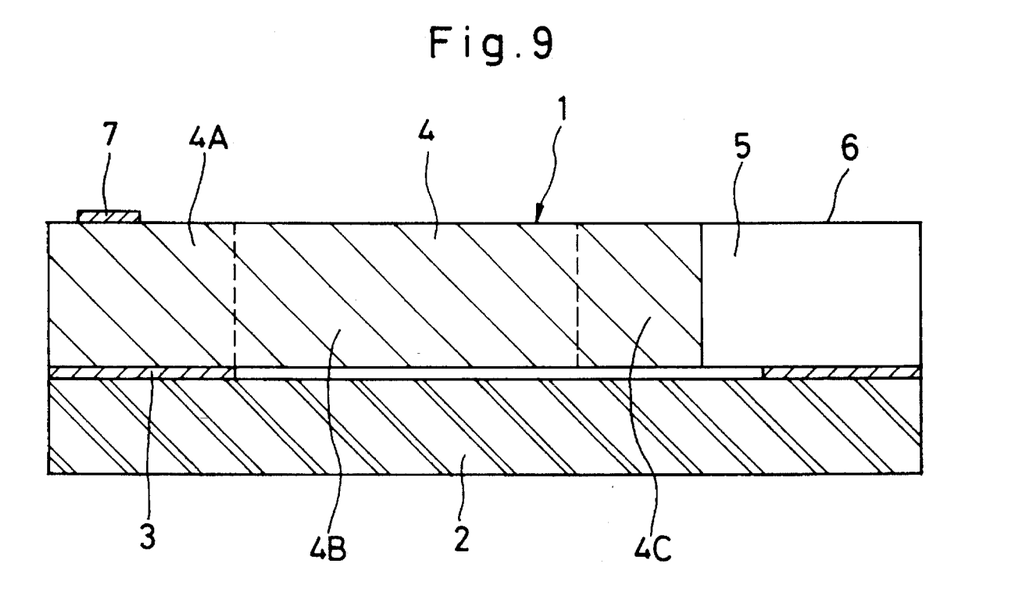
FIG. 9 is a vertical sectional view, showing a step of removing the masking film, subsequent to the step of forming the insulating groove shown in FIG. 8.

Finally, in an unmasking step shown in FIG. 9, the masking film 8, which has been formed in the preceding masking step, is removed by etching to expose the respective wiring electrodes to the outside, thus completing the fabrication of an acceleration sensor.

With the acceleration sensor of this embodiment, which is manufactured in the above-described manner, the support beam 4 is horizontally displaced within the insulating groove 5 according to the degree of acceleration applied thereto, varying the electrostatic capacitance between the mass portion 4C of the support beam 4 and the projected portion 6A of each stationary block 6. The variations in the electrostatic capacitance between the mass portion 4C and each projected portion 6A are transmitted to the wiring electrodes 7 through the support beam 4 and the respective stationary blocks 6 as output signals to be fed to a suitable electrostatic capacitance detection circuit or the like.

Thus, according to the present invention, the upper substrate 1, which is of a low resistance silicon material with resistivity of about 10 mΩcm, is formed with the insulating groove 5 which completely perforates the upper substrate 1 from its upper to lower side in such a manner as to form integrally the support beam 4 and the respective stationary blocks 6 in the upper substrate 1 simultaneously, and then the lower substrate 2 of a vitreous material or other suitable insulating material is welded to the lower side of the upper substrate 1, separating and electrically insulating the support beam 4 from the respective stationary blocks 6.

Consequently, the opposite lateral side surfaces of the mass portion 4C of the support beam can be utilized as movable electrodes, while the side surfaces of the projected portions 6A of the stationary blocks 6, which face the mass portion 4C, can be utilized as stationary electrodes. This contributes to simplify the acceleration sensor construction to a considerable degree. Accordingly, the construction according to the invention eliminates the necessity for providing the movable electrodes and stationary electrodes separately on the support beam 4 and the stationary blocks as described hereinbefore in connection with the prior art, permitting to reduce the number of component parts and to simplify the fabrication process to a marked degree which will lead to a substantial reduction in production cost.

Further, by the provision of the lower insulating substrate 2 on the lower side of the upper substrate 1 of low resistance, in combination with the insulating groove 5 which perforates the upper substrate 1 from its upper to lower side in such a manner as to form the support beam 4 separately from the stationary blocks 6 on the opposite sides thereof, the support beam 4 is electrically insulated from the respective stationary blocks 6. As a result, for example, the movable electrodes or the mass portion 4C of the support beam 4 is prevented from being electrically connected with the stationary electrodes or the projected portions 6A of the stationary blocks 6 through the fixed end 4A of the support beam 4, for the purpose of reducing the influence of noises effectively and permitting to improve the accuracy and sensitivity of the acceleration sensor operations to a marked degree.

Moreover, since the formation of the insulating groove 5 can be finished by one simple etching step as shown in FIG. 8, so that it becomes possible to cut down the etching process to a significant degree as compared with the prior art shown in the afore-mentioned Japanese Laid-Open Patent Specification 62-232171, contributing to simplify the fabrication process while improving the accuracy of detection.

Figure 10:
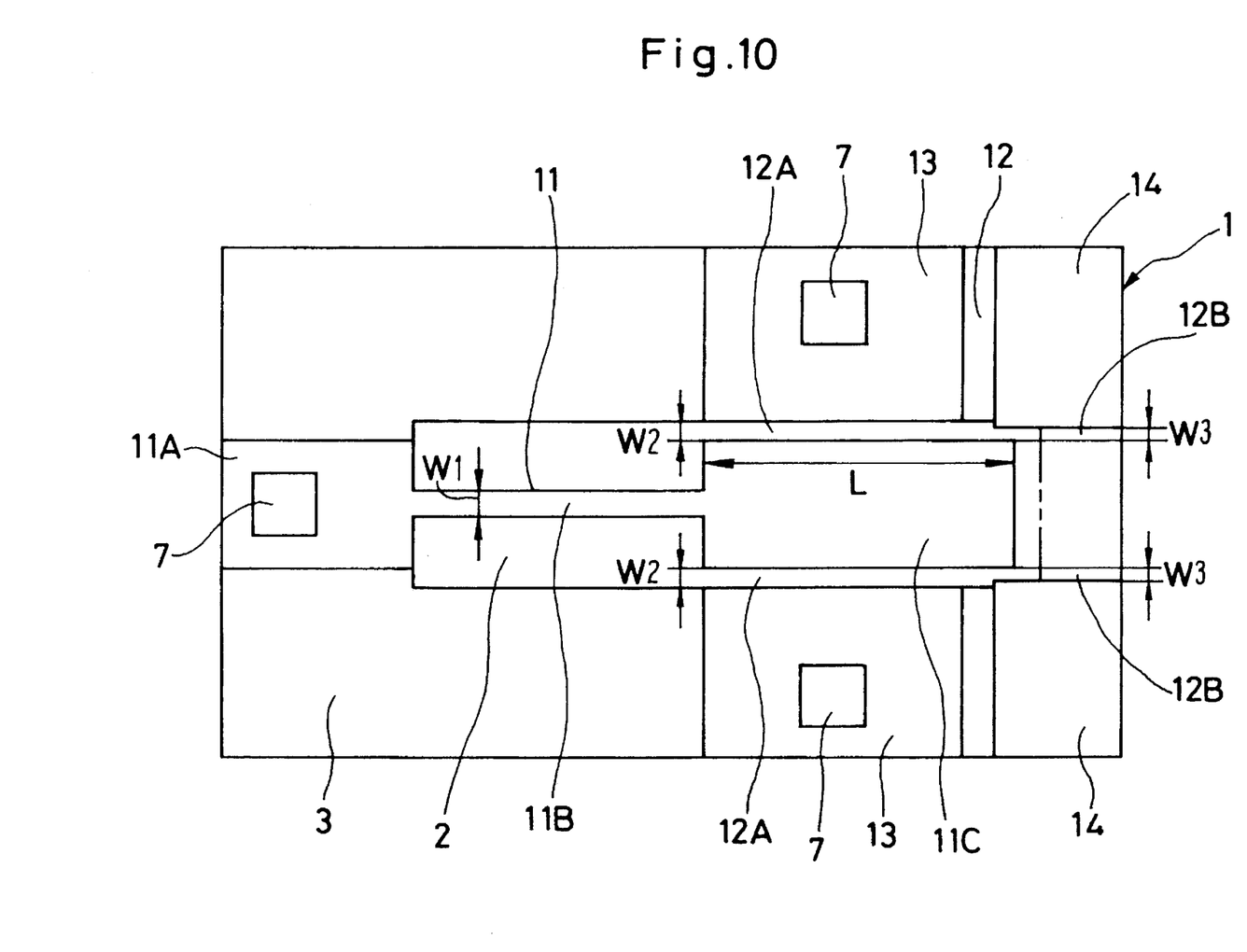
FIG. 10 is a plan view of an acceleration sensor in a second embodiment of the invention.

Referring now to FIG. 10, there is illustrated a second embodiment of the present invention, which is characterized by the provision of stoppers which are located on the opposite sides of the support beam to delimit the range of its horizontal displacement. In the following description of the second embodiment, the component parts common with the foregoing first embodiment are designated by common reference numerals or characters, and their explanations are omitted to avoid repetitions.

In FIG. 10, indicated at 11 is a support beam which is employed in this embodiment in place of the support beam 4 of the foregoing first embodiment. Similarly to the support beam 4 of the first embodiment, the support beam 11 is provided in an upper substrate 1 of low resistance, and largely constituted by a fixed base end 11A which is securely fixed to a lower substrate 2 through a glass layer 3, a support portion 11B which is reduced in thickness, and a mass portion 11C which is provided at its fore free end and increased in thickness to carry predetermined mass. The mass portion 11C also constitutes movable electrodes. In this particular embodiment, however, the mass portion 11C of the support beam 11 is formed to have a greater length L than the mass portion 4C of the first embodiment, and provided with stoppers 14 at its both sides as will be described later.

Denoted at 12 is an insulating groove employed in this embodiment, the insulating groove 12 being so formed as to circumvent the entire periphery of the support beam 11 and to perforate the upper substrate 1 completely from the upper to lower side thereof, substantially in the same manner as the insulating groove 5 of the foregoing first embodiment, separating and electrically insulating the support beam 11 from stationary blocks 13, which will be described later, while forming detection grooves 12A of a reduced width W2 therebetween. In this particular embodiment, however, the insulating groove 12 is formed over a larger area in such a way as to remove the upper substrate 1 around the peripheries of the fixed base end 11A and support portion 11B of the support beam 11 and to separate and insulate the respective stationary blocks 13 from the opposing stoppers 14. Besides, the insulating groove 12 is arranged to define, between the mass portion 11C of the support beam 11 and each stopper portion 14, a restraining grooves 12B of a width W3 narrower than the width W2 of the detection grooves 12A (W3<W2), thereby preventing the mass portion 11C from contacting the respective stationary blocks 13.

Indicated at 13 are the stationary blocks which are provided on the opposite sides of the support beam 11 and which confront the latter across the detection groove 12A. Each one of the stationary blocks 13 is formed out of the upper substrate 1 upon perforating the insulating groove 12, and provides a stationary electrode on its inner side surface confronting the mass portion 11C of the support beam 11, substantially in the same manner as the stationary blocks 6 of the foregoing first embodiment. However, the stationary blocks 13 of this embodiment differs from the stationary blocks 6 of the first embodiment in that they are provided only on the outer sides of the mass portion 11C of the support beam 11.

Indicated at 14 are a pair of stoppers which are formed integrally with the upper substrate 1 and which are located forwardly on the opposite sides of the mass portion 11C of the support beam 11 and spaced from the latter by a predetermined distance. The stoppers 14 functions to delimit the range of horizontal movement of the support beam 11 which is displaced according to the degree of acceleration, keeping the mass portion 11C out of contact with the respective stationary blocks 13.

Thus, the second embodiment with the above-described construction can produce substantially the same operational effects as the first embodiment. Besides, due to the provision of the stoppers 14, which confront the mass portion 11C of the support beam 11 through the restraining grooves 12B of the insulating groove 12, it can securely prevent the mass portion 11C of the support beam 11 from contacting the respective stationary blocks 13 to improve the operational reliability all the more.

Figure 11:
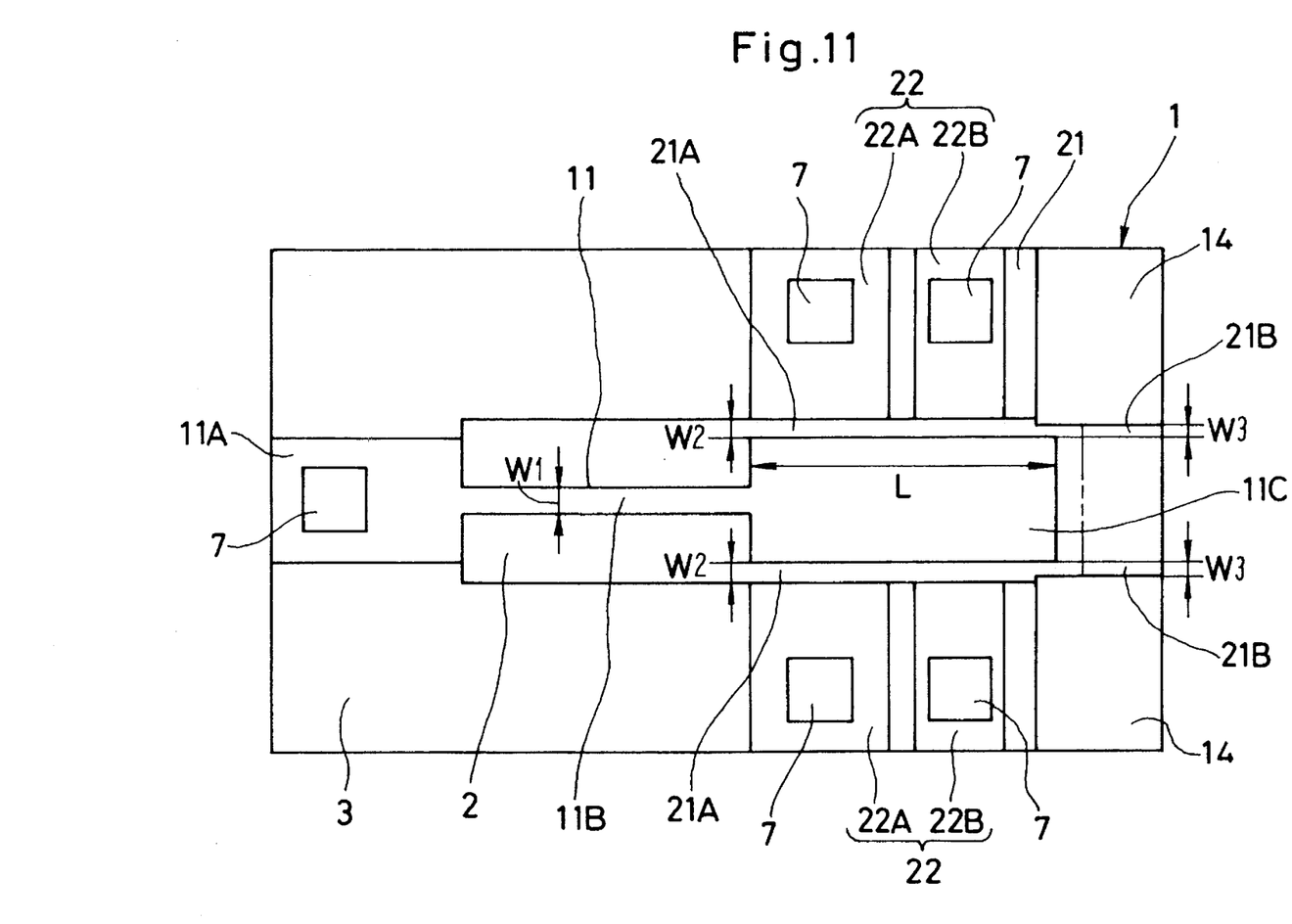
FIG. 11 is a plan view of an acceleration sensor in a third embodiment of the invention.

Illustrated in FIG. 11 is a third embodiment of the present invention, which is characterized in that each stationary block is divided into two subblocks to serve as a detecting electrode and a driving electrode, respectively, constituting the so-called servo type acceleration sensor containing a detection system and a drive system. In the following description of the third embodiment, the component parts common with the foregoing first and second embodiments are designated by common reference numerals or characters, and their explanations are omitted to avoid repetitions.

In FIG. 11, the reference 21 denotes an insulating groove employed in this embodiment in place of the insulating groove 12 of the above-described second embodiment. The insulating groove 21 which circumvents the entire periphery of the support beam 11 is so formed as to perforate the upper substrate 1 completely from the upper to the lower surface thereof substantially in the same manner as the insulating groove 12 of the above-described second embodiment, separating and electrically insulating the support beam 11 from the respective stationary blocks 22, which will be described later, and forming detection grooves 21A along with restraining grooves 21B. The insulating groove 21 of this embodiment, however, is arranged to longitudinally bisect each of the stationary blocks 22 to form a detecting stationary block 22A and a driving block 22B as will be described hereinlater.

The reference 22 indicates the stationary blocks employed in this embodiment, the stationary blocks 22 being located on the opposite sides of the mass portion 11 of the support beam 11 to confront the latter across a detection groove portion 21A of the insulating groove 21 and providing a stationary electrode on their inner side surfaces facing toward the mass portion 11C, substantially in the same manner as the stationary blocks 13 of the foregoing second embodiment. In this particular embodiment, however, each stationary block 22 is longitudinally bisected by the insulating groove 21 to define a detecting block 22A, which is located on the side of the fixed base end 11A of the support beam 11, and a driving block 22B, which is located on the side of the stopper 14 and smaller or narrower than the detecting block 22A.

In this instance, each detecting block 22A is connected to an electrostatic capacitance detection circuit through a lead wire (both not shown), and its side surface, which faces the mass portion 11C of the support beam 11, serves as a detection electrode for discriminating variations which occur to electrostatic capacitance according to the degree of acceleration. On the other hand, each driving block 22B is connected through a lead wire to an electrostatic drive circuit (not shown) which generates a driving voltage, serving as a driving electrode thereby to produce an electrostatic force between the driving block 22B and the support beam 11 on the basis of the electrostatic capacitance detected by the detection electrode of each detecting block 22A to zeroize the horizontal displacement of the support beam 11.

Needless to say, this embodiment, of the above-described construction, can produce substantially the same operational effects as in the first and second embodiments.

In each one of the foregoing embodiments, the invention has been described by way of a case in which a single unit of acceleration sensor is formed in an upper substrate 1. However, it is to be understood that the present invention is also applicable to those cases where a plural number of acceleration sensor units are to be formed simultaneously in one upper substrate. In the latter cases, acceleration forces of different directions can be detected by arranging the respective acceleration sensor units in such a manner as to vary the direction of detection from one sensor unit to another.

Further, the second substrate 2 of a vitreous or other insulating material, which is adopted in each of the foregoing embodiments, may be substituted, if desired, with a silicon substrate having its surfaces covered with an insulating oxidation film.

Moreover, although the stoppers 14 are separated from each other by the insulating groove 12 (21) in the above-described second and third embodiments, a different arrangement may be adopted as long as the stoppers 14 and the stationary blocks 13 (22) are insulated through the insulating groove 12 (21). Accordingly, the two stoppers 14 may be integrally connected with each other as indicated by two-dot chain line in FIGS. 10 and 11.

Furthermore, instead of forming the glass layer 3 in the entire peripheral edge portions on the lower side of the upper substrate 1 as described in the foregoing embodiments, it may be formed only in those areas which correspond to the fixed base end 4A (11A) of the support beam 4 (11) and the stationary blocks 6 (13, 22).

On the other hand, although the present invention has been described by way of a cantilever type acceleration sensor in the foregoing embodiments, it is to be understood that it can be similarly applied to the so-called dual support type sensors in which a mass portion is supported at two fulcrum points as shown for example in Japanese Laid-Open Patent Specification 3-112170.

Possibilities of Industrial Utilization

It will be appreciated from the foregoing detailed description that, according to the present invention, the acceleration sensor is largely constituted by a first substrate formed of a low resistance silicon material and a second substrate provided on lower side of the first substrate and electrically insulated from the first substrate, the first substrate including a support beam with a mass portion for displacement in the horizontal direction according to the degree of acceleration, an insulating groove completely perforating the first substrate around the entire periphery of the support beam, and stationary blocks defined on the opposite sides of the support beam by the insulating groove and fixed to the second substrate, so that the support beam and the stationary blocks are electrically insulated from each other by the insulating groove and the second substrate.

Consequently, it becomes possible to utilize the mass portion of the support beam as a movable electrode and the stationary blocks, which confront the mass portion across the insulating groove, can be utilized as fixed electrodes, permitting to simplify the construction of the acceleration sensor as a whole and its fabrication process to such a degree as will lead to a marked reduction in fabrication cost.

Further, due to the provision of the insulating second substrate under the first substrate of low resistance in combination with the insulating groove, which is formed around the entire periphery of the support beam and which completely perforates the first substrate from the upper to the lower side thereof, the support beam is separated and electrically insulated from the opposing stationary blocks. This prevents the mass portion of the support beam, which constitutes the movable electrode, from being electrically connected to any of the stationary blocks which constitute fixed electrodes, effectively suppressing the influence of noises to ensure improved accuracy and sensitivity of detection.

What is claimed is:

1. An acceleration sensor comprising:
   a first substrate formed of a silicon material which is used as a conductive material;
   a second substrate provided on the lower side of said first substrate and electrically insulated from the first substrate;
   said first substrate including;
      a support beam having a mass portion forming capacitive electrodes for displacement in a parallel direction to a surface of said second substrate according to the degree of acceleration, a fixed portion for fixing said support beam to said second substrate and a support portion for intermediately supporting said mass portion to said fixed portion,
      an insulating groove extending through a thickness of said first substrate around the entire periphery of said support beam, and stationary blocks forming capacitive electrodes defined by said insulating groove on the outer sides of said support beam separately across said insulating groove and fixed to said second substrate;
   gap means forming a gap space in order to space said mass portion and said support portion from a surface of said second substrate; and
   said second substrate being separated from said first substrate by an insulating layer which is at least provided on the lower side of said fixed portion and stationary blocks.

2. An acceleration sensor as defined in claim 1, wherein said insulating groove defines a narrow detection groove between said mass portion of said support beam and each of said stationary blocks, and movable and stationary electrodes are formed on lateral side surfaces of said support beam and said stationary blocks in face to face relation with each other across said detection groove.

3. An acceleration sensor as defined in claim 1, wherein said support beam is securely fixed to said second substrate at said fixed end, and reduced in a width in said support portion to provide at least one support for said mass portion in a fore free end portion to be displaced horizontally according to the degree of acceleration in the fashion of at least one fulcrum point type acceleration sensor.

4. An acceleration sensor as defined in claim 3, wherein, in order to prevent said mass portion on said support beam from contacting said stationary blocks, said second substrate is provided with stopper portions in positions on the opposite sides of the fore end of said mass portion, thereby delimiting the amount of displacement of said support beam.

5. An acceleration sensor according to claim 3, wherein said width of said support portion is smaller than a thickness of said fixed portion and said support beam provides a cantilever type support.

6. An acceleration sensor as defined in claim 1, wherein said first substrate is formed of silicon material with a (110) crystal face.

7. An acceleration sensor according to claim 6, wherein said first substrate is formed of a n-type silicon material.

8. An acceleration sensor as defined in claim 1, wherein said second substrate is selected from the group consisting of a glass and a vitreous material and bonded to the lower side of said first substrate through a glass layer.

9. An acceleration sensor according to claim 1, wherein said second substrate is formed of a silicon material having a surface covered with an insulating oxidation film.

10. An accceleration sensor according to claim 1, wherein each of said stationary blocks further comprises a detecting stationary block for detecting an electrostatic capacitance and a driving block for producing an electrostatic force for the support beam.

11. An acceleration sensor comprising:
   a substrate which is selected from the group consisting of an insulating material and oxidized semiconductor material;
   a support beam which includes a mass portion forming a predetermined mass and first capacitive electrodes on side surfaces of said mass portion, a fixed portion for fixing said support beam to said substrate and a thin support portion for intermediately connecting between said mass portion and said fixed portion;
   a pair of stationary blocks arranged on both sides of said support beam separately across an air gap and fixed to said substrate, said stationary blocks provided with second capacitive electrodes on the opposite sides of first capacitive electrodes of said mass portion;
   gap means forming a gap space in order to space said mass portion and thin support portion from a surface of said substrate; and
   said mass portion being displaced in a parallel direction to the surface of said substrate according to the degree of acceleration and said support beam and stationary blocks formed of a silicon material which is used as a conductive material and electrically insulated from said substrate.

12. An acceleration sensor according to claim 11, wherein said gap means is formed of an insulating layer at least between said substrate and said fixed portion of the support beam and said stationary blocks.

13. An acceleration sensor according to claim 12, wherein said insulating layer is glass and said substrate is selected from the group consisting of a glass and a vitreous material, and the lower side of said fixed portion of the support beam and said stationary blocks are bonded to said substrate through said insulating layer.

14. An acceleration sensor according to claim 11, wherein movable and stationary electrodes are formed on lateral side surfaces of said mass portion and said stationary blocks in face to face relation with each other across said air gap.

15. An acceleration sensor according to claim 11, wherein a width of said thin support portion is smaller than a thickness of said fixed portion.

16. An acceleration sensor according to claim 11, wherein said substrate is provided with stopper portions in positions on the opposite sides of said mass portion, thereby preventing said mass portion of said support beam from contacting said stationary blocks.

17. An acceleration sensor according to claim 11, wherein said support beam and stationary blocks are formed of a n-type silicon material with a (110) crystal face.

18. An acceleration sensor according to claim 11, wherein said substrate is formed of a vitreous material.

19. An acceleration sensor according to claim 11, wherein said substrate is formed of a silicon material having a surface covered with an insulating oxidation film.

20. An acceleration sensor according to claim 11, wherein each of said stationary blocks is formed of a detecting stationary block for detecting an electrostatic capacitance and a driving block for producing an electrostatic force for said support beam.

* * * * *